(12) United States Patent
Hamler et al.

(10) Patent No.: US 8,859,793 B2
(45) Date of Patent: Oct. 14, 2014

(54) PROCESS FOR EXTRACTING OIL FROM PLANTS AND ANIMAL MATTER

(71) Applicants: Jerry Hamler, Phoenix, AZ (US); Phil Munoz, Aptos, CA (US)

(72) Inventors: Jerry Hamler, Phoenix, AZ (US); Phil Munoz, Aptos, CA (US)

(*) Notice: Subject to any disclaimer, the term of this patent is extended or adjusted under 35 U.S.C. 154(b) by 1 day.

(21) Appl. No.: 13/659,215

(22) Filed: Oct. 24, 2012

(65) Prior Publication Data

US 2014/0114084 A1   Apr. 24, 2014

Related U.S. Application Data

(60) Provisional application No. 61/628,267, filed on Oct. 27, 2011.

(51) Int. Cl.
*C11B 1/10* (2006.01)
*B01D 11/00* (2006.01)

(52) U.S. Cl.
CPC .............. *C11B 1/104* (2013.01); *B01D 11/00* (2013.01)
USPC ........ 554/16; 554/8; 554/10; 554/12; 554/20; 554/22

(58) Field of Classification Search
None
See application file for complete search history.

(56) References Cited

U.S. PATENT DOCUMENTS

| | | | | |
|---|---|---|---|---|
| 2,560,935 | A * | 7/1951 | Dickinson | 554/16 |
| 2,682,551 | A * | 6/1954 | Miller | 554/16 |
| 4,331,695 | A * | 5/1982 | Zosel | 426/430 |
| 5,041,245 | A * | 8/1991 | Benado | 554/10 |
| 5,281,732 | A * | 1/1994 | Franke | 554/16 |
| 5,405,633 | A * | 4/1995 | Heidlas et al. | 426/442 |
| 5,525,746 | A * | 6/1996 | Franke | 554/12 |
| 5,739,364 | A * | 4/1998 | Franke | 554/16 |
| 6,248,910 | B1 * | 6/2001 | Franke | 554/12 |
| 6,676,838 | B2 * | 1/2004 | Corr et al. | 210/634 |
| 2002/0182722 | A1 * | 12/2002 | Corr et al. | 435/309.1 |

* cited by examiner

*Primary Examiner* — Yate K Cutliff
(74) *Attorney, Agent, or Firm* — Henry E. Naylor

(57) ABSTRACT

A process for extracting fats and oils from plant and animal matter using a normally gaseous solvent in its liquid state. Use is made of gravity flow and pressure differential from one vessel to another to transfer solvent from an upper vessel to a lower vessel. The vessels comprise an outer jacket to allow cooling and heating fluid to flow there-through to achieve better control of the pressure within each vessel.

13 Claims, 2 Drawing Sheets

PROCESS FOR EXTRACTING OIL FROM PLANTS AND ANIMAL MATTER

CROSS REFERENCE TO RELATED APPLICATIONS

This application is based on Provisional Application U.S. Ser. No. 61/628,267 filed Oct. 27, 2011.

FIELD OF THE INVENTION

The present invention relates to a process for extracting fats and oils from plant and animal matter using a normally gaseous solvent in its liquid state. Use is made of gravity flow and pressure differential from one vessel to another to transfer solvent from an upper vessel to a lower vessel. The vessels comprise an outer jacket to allow cooling and heating fluid to flow there-through to achieve better control of the pressure within each vessel.

BACKGROUND OF THE INVENTION

Oils derived from plant and animal matter are the source of raw material for many important commercial products. For example, oils from plant materials are extensively used in cooking, in cosmetics, in supplements in therapeutic oils, in essential oils, as carriers for insecticides and fungicides, in lubricants, and in myriad other useful products. Consequently, much work has been done over the years in developing improved processes for extracting oil from such materials.

The most widely used process for removing oil from oil-bearing materials is solvent extraction. In solvent extraction, the oil-bearing material is treated with a suitable solvent, usually the lower carbon alkanes such a propane and butane, at elevated temperatures and pressures, to extract the oil from the oil-bearing material. The resulting solvent/oil mixture is then fractionated to separate the valuable oil from the solvent, which is recycled. There are also teachings in the art that normally gaseous solvents can be used at both supercritical and subcritical conditions.

One such teaching is found in U.S. Pat. No. 5,281,732 to Franke wherein a normally gaseous solvent, such as propane, is used to extract oil from oil-bearing which is maintained at conditions to keep a normally gaseous solvent in liquid form, which is passed through a bed of oil-bearing material. The extracted material is collected and the resulting oil/solvent mixture is passed to a separation zone wherein the solvent is flashed off and recycled and the extracted oil collected. Oils are extracted from a variety of cooked foods, including potato chips, in U.S. Pat. No. 5,525,746, also to Franke.

Further, U.S. Pat. No. 4,331,695 to Zosel teaches a process for extracting fats and oils from oil-bearing animal and vegetable materials. The material is contacted with a solvent, such as propane, in the liquid phase and at a temperature below the critical temperature of the solvent to extract fat or oil from the material. The resulting solvent/oil mixture is treated to precipitate the extracted fat or oil from the solvent by heating the solvent to above the critical temperature of the solvent without taking up heat of vaporization. The extracted residue (shreds) is then treated to remove any entrained solvent, either by blowing it directly with steam, or by indirect heating followed by direct steaming.

Other references that teach solvent extraction of oil-bearing materials, with normally gaseous solvents, include U.S. Pat. No. 2,682,551 to Miller and U.S. Pat. No. 2,560,935 to Dickinson. The extracted material must be further processed to remove entrained solvent in each of these two references.

While prior art extraction processes have met with various degrees of commercial success, there still remains a need in the art for an improved solvent extraction process that is more energy and cost efficient, and which is especially suitable for the processing of temperature sensitive extracted oils derived from certain oil-bearing materials.

SUMMARY OF THE INVENTION

In accordance with the present invention, there is provided a process for extracting oil from oil-bearing materials in a process unit comprising a reactor vessel, a condensation/storage vessel, a vaporization/separation vessel, and an oil collection vessel, wherein the reactor vessel, the condensation/storage vessel, and the vaporization/separation vessel have an outer jacket covering at least 80% of each vessel, which outer jacket is capable of allowing a heating and cooling fluid to flow into an out of said jacket, which process comprising:

a) removing air and any other oxidizing gases from each vessel of the process unit;

b) ensuring that the condensation/storage vessel contains at least an effective amount of normally gaseous solvent in its liquid state, and if not conducting a normally gaseous solvent into said condensation/storage vessel;

c) introducing oil-bearing material to be extracted into said reactor vessel through an opened port;

d) closing and sealing the opened port of said reactor vessel containing oil-bearing material to be extracted;

e) pulling a vacuum on said reactor vessel and venting its' gaseous contents to the atmosphere;

f) introducing an effective amount of normally gaseous solvent in its liquid state into said reactor vessel from the condensation/storage vessel by raising the temperature and pressure within said condensation/storage vessel by flowing a heating fluid through the outer jacket of said condensation/storage vessel and lowering the temperature and pressure of said reactor vessel by passing a cooling fluid through the outer jacket of said reactor vessel so that the reactor vessel being at least 3 psi lower in pressure than the condensation/storage vessel;

g) repeatedly fluctuating the pressure within said reactor vessel by alternating the flow of heating and cooling fluid through the outer jacket of said reactor vessel, which pressure will fluctuate in the range of about 100 psig to about 300 psig, thereby resulting in oil-extracted solids material and a liquid mixture of extracted oil and solvent;

h) draining the resulting mixture of oil and solvent into said vaporization/separation vessel by passing a heating fluid through the outer jacket of said reactor vessel and by passing a cooling fluid through the outer jacket of the vaporization/separation vessel wherein the temperature of the heating fluid and temperature of the cooling fluid are such as to result in the vaporization/separation vessel being at least about 3 psi lower in pressure than said reactor vessel;

i) heating said vaporization/separation vessel to an effective temperature to vaporize substantially all of the normally gaseous solvent and allowing the vaporized normally gaseous solvent to flow upward into said condensation/storage vessel, which heating is provided by passing a heating fluid of sufficient temperature through the outer jacket of the vaporization/separation vessel to cause the liquid normally gaseous solvent in the vaporization/separation vessel to be converted to a vapor;

j) cooling said condensation/storage vessel, by passing a cooling fluid of sufficient temperature through the outer jacket of said condensation/storage vessel to cause the pressure within the condensation/storage vessel to be at least 10 psi lower than the pressure in said vaporization/separation vessel, thereby enhancing the transfer of vaporized normally gaseous solvent and to result in the conversion of the vaporized normally gaseous solvent to its liquid state;

k) conducting oil from the vaporization/separation vessel to the oil collection vessel;

l) collecting the oil-depleted solid material from the reactor vessel.

In a preferred embodiment a vacuum is pulled on the reactor vessel after the transfer of the oil/solvent mixture to remove any remaining solvent vapors and transferring it to the condensation/storage vessel.

In a preferred embodiment a vacuum is pulled on the vaporization vessel after step i) to remove any remaining vaporized normally gaseous solvent and conducting it to the condensation/storage vessel.

In another preferred embodiment a vacuum is pulled on the oil collection vessel subsequent to step k) and transferring any vaporized normally gaseous solvent to the condensation/storage vessel.

In another preferred embodiment the normally gaseous solvent is propane.

DETAILED DESCRIPTION OF THE INVENTION

Any oil-bearing vegetable and animal material can be extracted by the practice of the present invention. Non-limiting examples of preferred plant and crop materials, include trees, roots, shrubs, bushes, leaves, seeds, nuts, bark, trunks, branches, stalks, flowers, herbs, basil, bergamot, cajeput, red cedar, cardamom, chamomile, cinnamon bark, cistus, citronella, clary sage, clove, coriander, cumin, cypress, dill, elemi, eucalyptus, fennel, fleabane, geranium, grapefruit, helichrysum, hyssod, hyssop, jasmine, lavandin, lavender, lemon, lemongrass, mandarin, marjoram, melaleuca, melissa herb, mountain savory, myrrh, neroli, nutmeg, organe, oregano, and palmarosa. Preferred oils to be extracted are those that are obtained from plant material found in the Amazon Rain Forest, as well as in other parts of South America and Africa. Also preferred are those that can be used to heal or treat human or animal ailments. Other preferred oils to be extracted include jojoba, argan, hemp, cannabis, and peppermint. Most preferred is jojoba oil that can be further processed to produce a biofuel, such as biodiesel.

Solvents suitable for use in the present invention are any solvent that is normally a liquid at extraction conditions, such as propane, or which can be converted to a liquid at extraction conditions. Preferred solvents are those that are normally gaseous at typical atmospheric conditions. That is, those which are a gas at about ambient temperature (about 60° F.) and atmospheric pressure. It is also preferred that the solvent be non-toxic to and not carcinogenic to humans. Non-limiting examples of preferred solvents include methane, ethane, propane, butane, ethylene, propylene, butylene, sulfur dioxide, carbon dioxide, $CHF_3$, $CClF_3$, $CFBr_3$, $CF_2\!=\!CH_2$, $CF_3\!-\!CF_2\!-\!CF_3$, $CF_4$, $CF_4$, $CH_3\!-\!CF_3$, $CHCl_2$. Preferred are propane, butane, and mixtures thereof. More preferred is propane. The weight ratio of solvent to oil-bearing material will be from about 1:1 to 2:1, preferably from about 1.2:1 to 1.5:1. A co-solvent, such as a $C_2$ to $C_6$ alcohol, preferably ethanol, can also be used. If a co-solvent is used it can be used in place of at least about 5 to 90 vol. %, preferably about 5 to 50 vol. %, and more preferably from about 5 to 25 vol. %, of the primary normally gaseous solvent.

Figure 1:
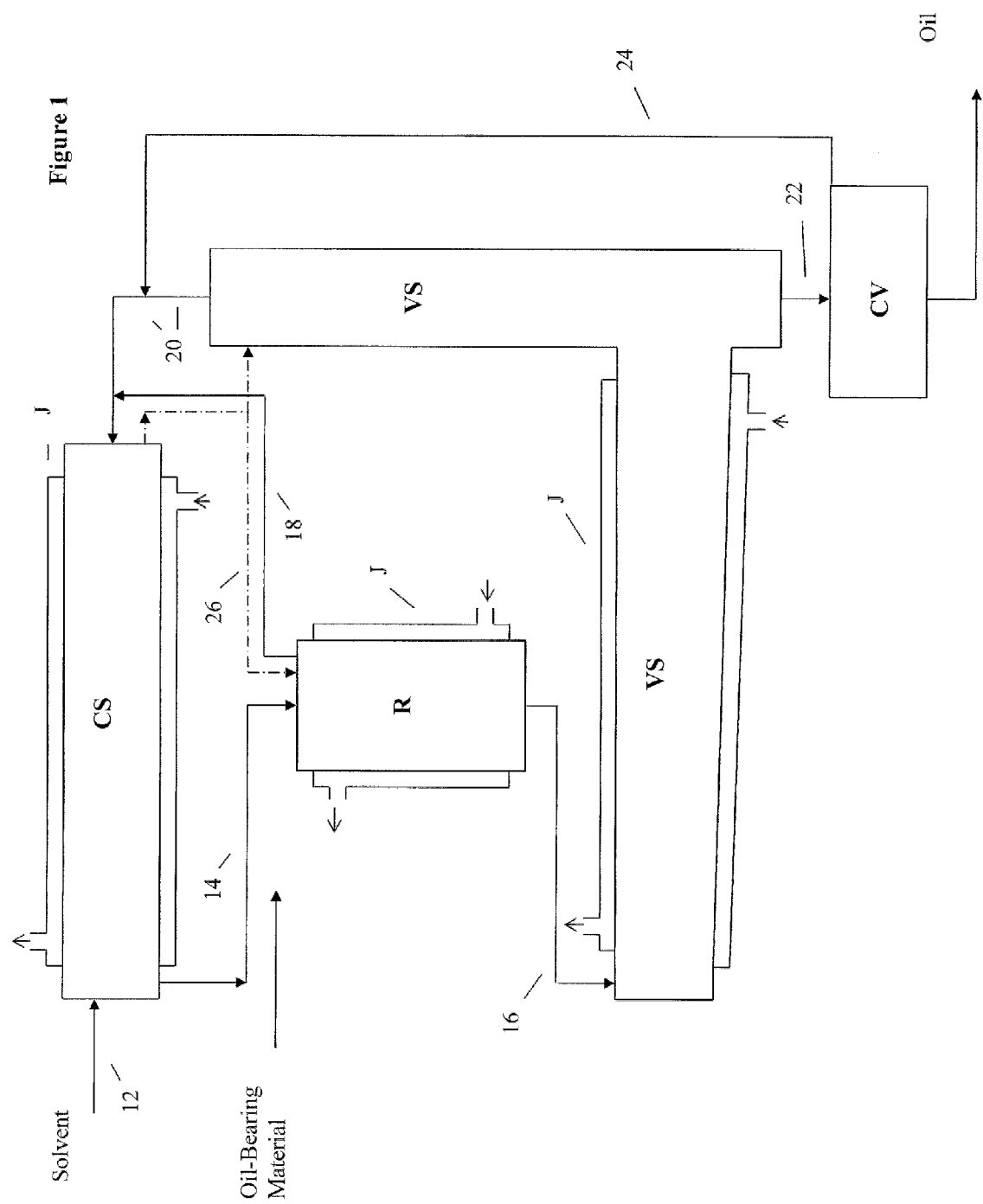
FIG. 1/2 hereof is a simplified schematic of one embodiment of a preferred solvent extraction process of the present invention showing only one of each vessel.

The figures hereof show preferred embodiments for practicing the present invention. FIG. 1/1 hereof is a simplified diagram of the most basic major process equipment required to practice the present invention. Minor conventional components such as valves, metering devices and compressor are not shown for simplicity reasons. This figure comprises at least one condensation/storage vessel CS, at least one reactor vessel R, at least one vaporization/separation vessel VS and at least one oil collection vessel CV. In a preferred embodiment, the equipment to perform the instant process is contained on a transportable skid. Such a process unit would have the advantage of being able to be easily moved from one location to location to take advantage of temporary needs, such as the seasonal harvesting of various oil-bearing crops.

It is preferred that more than one reactor vessel be used and it is more preferable that three, most preferably four or five reactor vessels be used so that each vessel can be undergoing a different stage in the overall process. For example, a first vessel can be undergoing loading of oil-bearing material and solvent, while a second reactor vessel can be undergoing extraction, while a third vessel can be undergoing drainage of the resulting oil/solvent mixture, while a fourth vessel can be undergoing removal of any remaining solvent vapors, removal of extracted material and removal of air and other oxidizing gases. Of course, the one or more other vessels in the process unit will also be undergoing their intended functions depending on the fluid connectivity to its associated vessels. It is preferred that solvent and the oil/solvent mixture be transferred from an upper vessel to a lower vessel by gravity flow, which can be aided by creating a pressure differential in the vessels by use of a cooling or heating fluid flowing through the outer jacket of the targeted vessels participating in the fluid transfer. This will be explained in more detail below with respect to FIG. 1/2 hereof. At least 80% of the outer surface of each vessel will contain the outer jacket J that will be in fluid communication with a cooling/heating system (FIG. 2/2 hereof) capable of generating the cooling fluid and heating fluid at suitable volumes and temperatures needed to provide the appropriate temperatures and pressures in each reactor. The plumbing needed to connect the cooling/heating system of FIG. 2/2 hereof and the outer jackets of the vessels of FIG. 1/2 hereof only requires conventional plumbing technology known to those having at least ordinary skill in the art and any further detail herein is not needed to reproduce this invention.

The use of cooling and heating fluid flowing through these outer jackets helps to maintain an effective pressure difference between vessels that are participating in the transfer of solvent or solvent/extracted-oil mixture. By "effective pressure difference" we mean at least that amount of pressure required to enhance the flow of solvent or solvent/oil mixture, from one vessel to another, but not so much as to cause process problems, or to unnecessarily drive up the cost of the process. An effective pressure difference will be from about 3 to 30 psi, preferably from about 5 to 20 psi, more preferably from about 5 to 15 psi, and most preferably from about 5 to 10 psi. Maintaining this effective pressure difference between vessels also helps to prevent any freezing of the normally gaseous solvent or the product oil being extracted. Control of the pressure within each vessel is accomplished by circulating a cooling or heating fluid, preferably water, but more preferably a water/glycol mixture. It is preferred that the water/glycol mixture be a 65/35, preferably an 80/20 water to glycol mixture. A water/glycol system is preferred to prevent the water in the cooling fluid of the outer jackets from freezing and damaging the vessels. Should there be a rapid change of state of the solvent in a vessel from a liquid to a vapor, this could drop the temperature of the water in the outer jackets to a temperature below freezing (32° F.), thus damaging the vessel. Also, further damage could be done in the chilled water heat exchanger. Because of the low chilled water temperatures required for the instant process, there could also be a freeze-up in the chilled water heat exchanger that can result in damage to the heat exchanger. This could happen when the refrigerant in the heat exchanger changes from a liquid state to a vapor state when the cooling water in the heat exchanger is already close to freezing.

Figure 2:
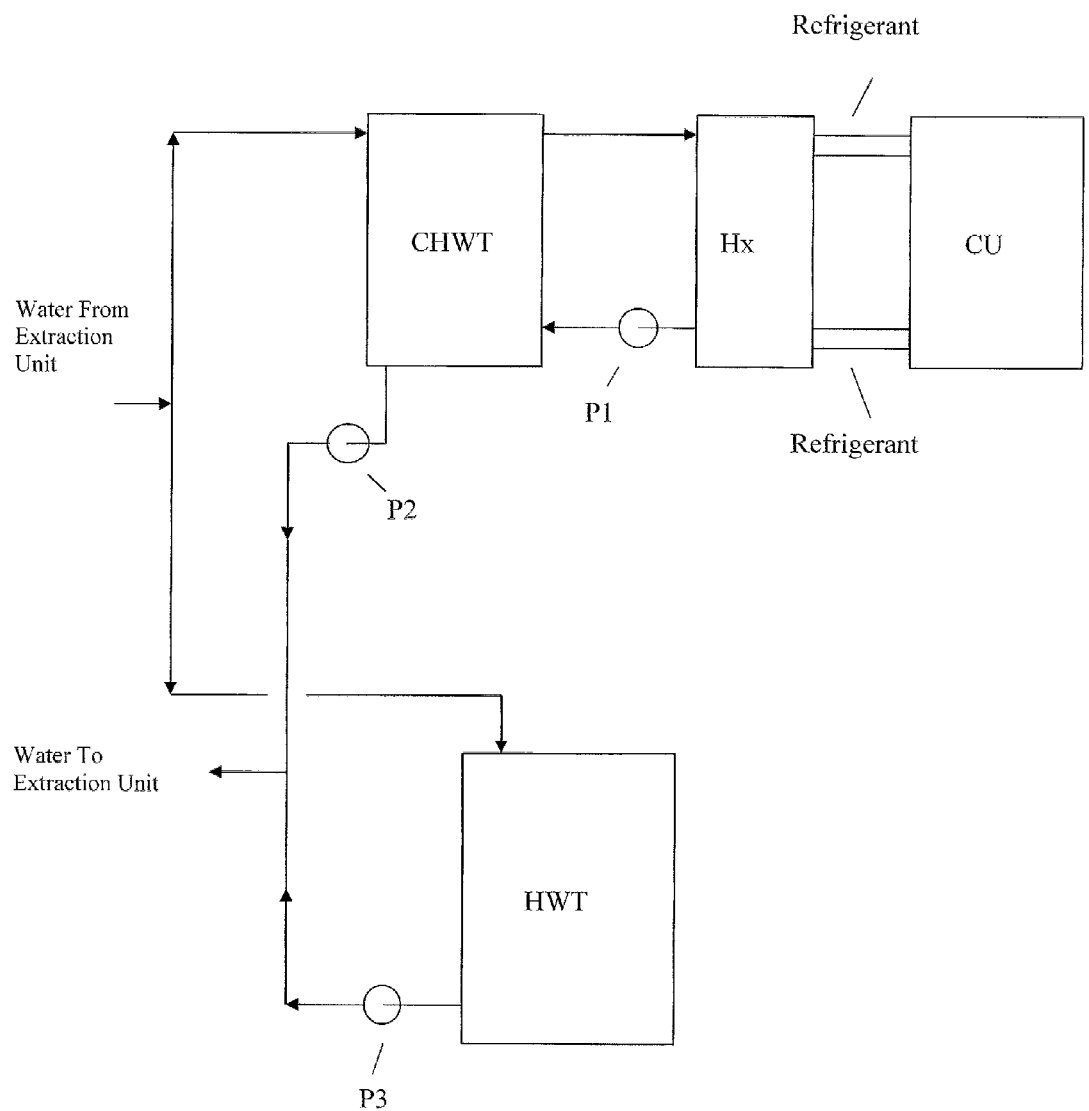
FIG. 2/2 hereof is a preferred system for generating heated water and chilled water to the jackets of the vessels used in the instant process.

A preferred system for generating heated water and cooled water is shown in FIG. 2/2 hereof and will be discussed in more detail below. The chiller system of FIG. 2/2 is used to provide cooling fluid of about 40° F. or less, to the outer jackets on all vessels, when needed, and is also used to convert the normally gaseous solvent to the liquid state in the condensation/storage vessel CS. A hot water generator is used to provide heating fluid (hot water) at a temperature of about 65° F. to about 130° F., preferably from about 70° F. to about 105° F. to the outer jackets of all the vessels to help regulate pressure within each vessel when needed for any given stage of the instant process. It is also used to aid in the conversion of liquid normally gaseous solvent to its vapor phase.

One preferred mode of operation of the present invention is to first remove substantially all of air, or any other oxidizing gases, from all vessels, especially the reactor vessel. The removal of air and other oxidizing gases is preferably performed by use of a compressor to pull a vacuum on each vessel, either individually or simultaneously. The air or other oxidizing gases are vented to the atmosphere. The compressor is not shown in the figure hereof, but such equipment is well known to those having at least ordinary skill in the art. A single compressor can be used to pull a vacuum on any one or more vessels as needed as well as to aid in the pressurization of any one or more vessels when needed. When the oil that is being extracted from the oil-bearing material is sensitive to temperature and there is not enough pressure in reactor vessel to extract the oil, the compressor high side can be used to increase the pressure in the reactor vessel to the required pressure to extract oil from the oil-bearing material with only a slight increase in temperature. This slight increase in temperature is due to the heat of compression. The pressure in the reactor vessel should not be raised above the maximum operating pressure rating for the process equipment. The compressor low side can be used to remove any solvent vapors that may accumulate in the reactor vessel when filling the reactor vessel with extraction fluid (solvent) in the liquid state, thus allowing the reactor vessel to fill with liquid solvent at a faster rate and transferring those solvent vapors to the condensation/storage vessel. Further, the compressor low side can also be used to assist in transferring solvent vapors from the vaporization/separation vessel and to the condensation/storage vessel during the vaporization phase of the process. In steps 2 and 3, the compressor will need to be cycled off & on to maintain the desired pressure difference between vessels.

After the air and other oxidizing gases have been vented from the vessels, reactor vessel R is opened, and the oil-bearing material to be extracted is introduced into the reactor vessel. Any suitable hatch or door arrangement can be used for the reactor vessel of the present invention so long as the opening port is large enough to accommodate the instruction of oil-bearing material in a predetermined form and that it be able to establish a seal that can withstand the operating pressures of the reactor vessel R. A preferred type of hatch or door is a hinged T-bolt type available from Sypris Technologies Tube Turns Division. It is within the scope of this invention that reactor vessel R be pressurized with an inert gas, preferably nitrogen, to an amount of pressure that is effective to aid in the opening of the door or hatch since the reactor vessels may have just previously been under vacuum. This amount of effective pressure will typically be in the range of about 15 to 20 psi, preferably from about 15 to 18 psi. It is preferred that the oil-bearing material to be extracted be introduced into reactor vessel R in a suitable containing means. Such a containing means will be a porous container of suitable material for the oil being extracted. The containers should be of sufficient porosity to allow the solvent to flow in all directions through the container and its' oil bearing material contents. One preferred container will be a 40 to 100 mesh container manufactured from a 316 stainless steel. Another preferred container will be a cotton bag having a 150 to 300, preferably a 200 to 300 thread count. The containers used in the practice of this invention will be of a size that will leave a space between the container walls and the inside wall surface of reactor vessel R of from about ¼ inch to ½ inch, preferably from about ¼ inch to about ⅜ inch. Such as gap in more preferable along the vertical walls of the reactor.

If condensation/storage vessel CS does not already contain a suitable amount, at least about 70 vol. %, of normally gaseous solvent in the liquid state, it can be introduced via line 12. An effective amount of normally gaseous solvent in the liquid state is conducted from condensation/storage vessel CS via line 14 to reactor vessel R. By effective amount of normally gaseous solvent we mean at least that minimum amount needed to effectively extract substantially the maximum amount of oil capable of a single extraction on the given oil-bearing material under the extraction conditions used. This amount can vary depending on the oil-bearing material being extracted and the predetermine process conditions. It is preferred that the normally gaseous solvent be conducted from condensation/storage CS by passing a heating fluid, at an effective temperature, through the outer jacket J of condensation/storage vessel CS while passing a cooling fluid through the outer jacket J of reactor vessel R. This procedure raises the temperature and pressure in condensation/storage vessel CS and lowers the temperature and pressure in reactor vessel R, thus encouraging the flow of normally gaseous solvent in a liquid state to reactor vessel R. It is preferred that the pressure differential between vessels, to encourage fluid transfer be at least about 5 psi, more preferably from about 5 to 10 psi. Of course the vessel on the receiving end of the fluid transfer will be at the lower pressure.

After reactor vessel R is loaded with oil-bearing material and normally gaseous solvent it is preferably then heated by passing heating fluid through its outer jacket J to provide a pressure within the vessel from about 100 psig to about 300 psig, preferably from about 200 psig to about 275 psig. Reactor vessel R is then cooled by passing a cooling fluid through its outer jacket J to reduce the pressure within the vessel by about 100 to 150 psig, preferably about 100 psig. It is to be understood that this heating/cooling cycle is to be repeated an effective number of times. That is, for that minimum number of cycles that will result in at least a 15 vol. % increase, preferably at least a 20 vol % increase in extracted oil, compared to the case where no heating/cooling cycle is used. Preferred cycles include temperature holding times of about 5 to 15 minutes, preferably about 8 to 12 minutes with about 5 to 10, preferably about 5 temperature cycles. This fluctuation in pressure will enhance the ability of the solvent to extract oil from the oil-bearing material. The result is an extracted oil-bearing material and a mixture of oil and liquid normally gaseous solvent.

The temperature maintained in reactor vessel R, during reaction will typically range from about ambient temperature to about 140° F., preferably from about 60° F. to about 130° F., more preferably from about 70° F. to about 120° F., most preferably from about 70° F. to about 110° F. It is within the scope of the present invention to operate the extraction zone at a temperature that will leave any substances, such as gums and waxes, in the extracted oil-bearing material. Such a temperature will typically be less than about 80° F. at about atmospheric pressure. Of course, the temperature may vary somewhat at different pressures. These temperatures may also vary for any given oil-bearing material and solvent combination, and the precise conditions are within the skill of those in the art given the teaching herein. It is important that the temperature maintained in reactor vessel R not be so high that any desired extracted products, other than oil, such as proteins, enzymes, and vitamins not be destroyed or degraded to a point that makes them undesirable for their intended purpose or commercial market.

After the extraction cycle is completed, the resulting oil/solvent mixture is conducted from reactor vessel R to vaporization/separation vessel VS via line 16. This is preferably done by passing a heating fluid of sufficient temperature through the outer jacket of reactor vessel R and simultaneously flowing a cooling fluid through the outer jacket of vaporization/separation vessel VS. Any solvent vapors remaining in reactor vessel R can be removed by pulling a vacuum on the reactor vessel and venting the remaining solvent vapors, via line 18, to condensation/storage vessel CS. It will be understood that an inert gas, preferably nitrogen, is not used to help move the solvent/extracted oil mixture from reactor vessel R to vaporization/separation vessel VS. While some conventional solvent extraction processes teach the use of nitrogen for such a purpose, it is critical to operation of the present invention that an inert not be used, but that the transfer of solvent/extracted oil mixture be transferred by use of adjusting the pressures within the reactor vessel and the vaporization/separation vessel so that a pressure differential, as previously mentioned, exist between the vessels with the lower pressure being in the vaporization/separation vessel.

It is preferred that the condensation/storage vessel CS and vaporization/separation vessel VS be horizontally positioned, with the bottom of each vessel sloped downward toward the fluid outlet to enable the fluid to more readily exit the upstream vessel by way of gravity. It is to be understood that more than one extraction can be performed on the same oil-bearing material in order to extract as much oil as economically feasible. In many cases, enough oil will be left in the oil-bearing material to justify one or more additional extraction cycles.

As previously mentioned, the resulting extracted material left in reactor vessel R can be removed if a predetermined amount of oil has been removed, or it can be left in the reactor to undergo one or more additional extraction cycles. The resulting oil-solvent mixture, that will be liquid form, is conducted to vaporization/separation vessel VS, via line 16, where the solvent is caused to vaporize by applying a sufficient amount of heat by passing a heating fluid of sufficient temperature through the outer jacket to cause the solvent to vaporize and move into the vertical section of the vaporization/separation vessel and be conducted upward and via line 20 to condensation/storage vessel CS. The resulting oil is conducted, preferably by gravity flow, to oil collection vessel CV via line 22. Any remaining vaporized solvent can be conducted via lines 24 and 20 to condensation/storage vessel CS. It is preferred that a pressure equalization line 26 be provided between the CS, R, and VS vessels. The pressure equalization line will flow solvent vapors from one or more condensation/storage vessels CS to the one or more reactor vessels R and the one or more vaporization/separation vessel VS. This allows pressure equalization of the vessels that have been pulled to a vacuum during transfer any remaining solvent vapors to the condensation/storage vessel(s). Prior to the flow of solvent in the liquid state into the reactor vessel(s) or to the vaporization/separation vessel(s), the pressure equalization line 26 will take the vessels from a vacuum to a pressure close to the transfer pressure required to transfer solvent in the liquid state. The heating/cooling jackets J on the vessels will then be used to make the final pressure adjustment. The pressure equalization line 26 takes the reactor vessel(s) and the vaporization/separation vessel(s) from a vacuum to a pressure close to the required pressure for solvent to be transferred in a liquid state. In other words, the pressure equalization line 26 is important to the operation and efficiency of the present process. When a vacuum has been pulled on reactor vessel R and vaporization/separation vessel VS to remove any remaining solvent vapors after a process run, and the vapors from those vessels have been transferred to condensation/storage vessel CS, the reactor vessel R and vaporization/separation vessel VS remain under vacuum. There is very little, if any, heat transfer that occurs in a vacuum so flowing heating or cooling fluid through the outer jackets are ineffective. Also, if solvent in the liquid state were to be transferred to a vessel under vacuum it will flash to the vapor state. By transferring solvent in a vapor state from condensation/storage vessel CS within a preferred pressure range 5 PSI to 40 PSI, more preferred 10 to 25 PSI and most preferably 10 to 15 PSI of the pressure in condensation/storage vessel CS will eliminate the vacuum and will allow the outer jackets to be used to effectively control the pressure in the vessels. With the solvent vapors that are now in reactor vessel R or vaporization/separation vessel VS the outer jackets can be used to adjust the pressure to the effective pressure required to transfer solvent in the liquid state into reactor vessel R and/or vaporization/separation vessel VS.

FIG. 2/2 hereof is a preferred system for generating heated water and cooled water to be flowed through the outer jackets of the vessels of the present invention. No such system is presently available in the art. The chiller section of this system is comprise of a condensing unit CU, a heat exchanger HX, a chilled water tank CHWT, a primary pump P1, a secondary pump P2. The heating fluid section is comprised of a hot water tank HWT and pump P3. It is preferred that the hot water be produced by use of an immersion heater (not shown) which is conventional in the art. Condensing unit CU passes refrigerant through one side of heat exchanger HX. The primary pump P1 conducts a cooling fluid, preferably water or water/glycol mixture, through the other side of heat exchanger HX where heat is transferred from cooling fluid to the refrigerant, thus lowering the temperature of the cooling fluid to a predetermined temperature. The refrigerant is then returned to the condensing unit where the heat that was transferred to it is vented to the atmosphere. It will be understood that it is preferred that all outer jackets of the vessels of the process vessels of the present invention are capable of being in fluid communication with both the heating fluid and the cooling fluid and a manifold is used to direct the flow of either the cooling fluid or heating fluid to the outer jacket of any given vessel depending on what stage of the process that vessel is undergoing. In other words, the cooling/heating system is in fluid communication with the outer jackets of all vessels.

It is also to be understood that in those situations where the oil-bearing material is one which is unstable because of the production of fatty acids, a stabilizing agent can be added to the reactor vessel. Any appropriate means can be used to add the stabilizing agent. That is, it can be sprayed onto the oil-bearing material prior to the material being introduced into the extraction zone. It can also be introduced into the extraction zone or in combination with the solvent. Non-limiting examples of stabilizers which can be used include an inert gas, food grade acids and alcohols, mercaptans, and enzyme inhibitors. Preferred are food grade acids and alcohols, non-limiting examples include citric acid, ascorbic acid, lactic acid, gluconic acid, malic acid, ethanol.

What is claimed is:

1. A process for extracting oil from oil-bearing materials in a process unit comprising a reactor vessel, a condensation/storage vessel, a vaporization/separation vessel, and an oil collection vessel, wherein the reactor vessel, the condensation/storage vessel, and the vaporization/separation vessel have an outer jacket covering at least 80% of each vessel, which outer jacket is capable of allowing a heating and cooling fluid to flow into an out of said jacket, which process comprising:
   a) removing air and any other oxidizing gases from each vessel of the process unit;
   b) ensuring that the condensation/storage vessel contains at least an effective amount of normally gaseous solvent in its liquid state, and if not conducting a normally gaseous solvent into said condensation/storage vessel;
   c) introducing oil-bearing material to be extracted into said reactor vessel through an opened port;
   d) closing and sealing the opened port of said reactor vessel containing oil-bearing material to be extracted;
   e) pulling a vacuum on said reactor vessel and venting its' gaseous contents to the atmosphere;
   f) introducing an effective amount of normally gaseous solvent in its liquid state into said reactor vessel from the condensation/storage vessel by raising the temperature and pressure within said condensation/storage vessel by flowing a heating fluid through the outer jacket of said condensation/storage vessel and lowering the temperature and pressure of said reactor vessel by passing a cooling fluid through the outer jacket of said reactor vessel so that the reactor vessel being at least 3 psi lower in pressure than the condensation/storage vessel;
   g) repeatedly fluctuating the pressure within said reactor vessel by alternating the flow of heating and cooling fluid through the outer jacket of said reactor vessel, which pressure will fluctuate in the range of about 100 psig to about 300 psig, thereby resulting in oil-extracted solids material and a liquid mixture of extracted oil and solvent;
   h) draining the resulting mixture of oil and solvent into said vaporization/separation vessel by passing a heating fluid through the outer jacket of said reactor vessel and by passing a cooling fluid through the outer jacket of the vaporization/separation vessel wherein the temperature of the heating fluid and temperature of the cooling fluid are such as to result in the vaporization/separation vessel being at least about 3 psi lower in pressure than said reactor vessel;
   i) heating said vaporization/separation vessel to an effective temperature to vaporize substantially all of the normally gaseous solvent and allowing the vaporized normally gaseous solvent to flow upward into said condensation/storage vessel, which heating is provided by passing a heating fluid of sufficient temperature through the outer jacket of the vaporization/separation vessel to cause the liquid normally gaseous solvent in the vaporization/separation vessel to be converted to a vapor;
   j) cooling said condensation/storage vessel, by passing a cooling fluid of sufficient temperature through the outer jacket of said condensation/storage vessel to cause the pressure within the condensation/storage vessel to be at least 10 psi lower than the pressure in said vaporization/separation vessel, thereby enhancing the transfer of vaporized normally gaseous solvent and to result in the conversion of the vaporized normally gaseous solvent to its liquid state;
   k) conducting oil from the vaporization/separation vessel to the oil collection vessel;
   l) collecting the oil-depleted solid material from the reactor vessel.

2. The process of claim 1 wherein a vacuum is pulled on the reactor vessel after the transfer of the oil/solvent mixture to remove any remaining solvent vapors and transferring it to the condensation/storage vessel.

3. The process of claim 1 wherein a vacuum is pulled on the vaporization vessel after step i) to remove any remaining vaporized normally gaseous solvent and conducting it to the condensation/storage vessel.

4. The process of claim 1 wherein the normally gaseous solvent is selected from the group consisting of propane, butane and mixtures thereof.

5. The process of claim 1 wherein the extracted oil is selected from the group consisting of jojoba, argan, hemp, cannabis, and peppermint.

6. The process of claim 1 wherein the ratio of solvent to oil-bearing material introduced into the reactor vessel is from about 1 to 1 to about 2 to 1.

7. The process of claim 1 wherein the pressure difference between two vessels undergoing transfer of solvent or solvent/oil mixture is from about 3 to 30 psi.

8. The process of claim 7 wherein the pressure difference is from about 5 to 20 psi.

9. The process of claim 1 wherein the oil bearing material is introduced into said reactor vessel in a porous container capable of allowing solvent to pass there-through in all directions.

10. The process of claim 9 wherein the porous container is a stainless steel container which has 40 to 100 mesh openings on all surfaces.

11. The process of claim 9 wherein the porous container is a cloth bag having a thread count of about 150 to 300 threads per square inch.

12. The process of claim 1 wherein both the heating cycle and the cooling cycle of the reactor vessel, during extraction, is held at each temperature of each cycle for about 5 to 15 minutes and wherein there are from about 5 to 10 cycles for at least a first extraction.

13. The process of claim 1 wherein the temperature in the reactor vessel during extraction is from about 60 to about 140° F.

* * * * *